United States Patent
Lee

(10) Patent No.: US 7,564,804 B2
(45) Date of Patent: Jul. 21, 2009

(54) METHOD OF ASSIGNING ADDRESSES TO A PLURALITY OF DEVICES ON A NETWORK AND A NETWORK SYSTEM THEREFOR

(75) Inventor: Yeon Kyoung Lee, Goyang-si (KR)

(73) Assignee: LG Electronics Inc., Seoul (KR)

( * ) Notice: Subject to any disclaimer, the term of this patent is extended or adjusted under 35 U.S.C. 154(b) by 454 days.

(21) Appl. No.: 11/065,964

(22) Filed: Feb. 24, 2005

(65) Prior Publication Data
US 2005/0185595 A1    Aug. 25, 2005

(30) Foreign Application Priority Data
Feb. 25, 2004    (KR)    ............... 10-2004-0012577

(51) Int. Cl.
H04L 12/28    (2006.01)
H04W 4/00    (2006.01)
G06F 15/16    (2006.01)
(52) U.S. Cl. .............. 370/255; 709/228; 709/229; 455/422.1; 455/426.2
(58) Field of Classification Search ............. 370/254, 370/255
See application file for complete search history.

(56) References Cited

U.S. PATENT DOCUMENTS 5,583,850 A    12/1996   Snodgrass et al.
6,658,474 B2 *  12/2003   Kang ................ 709/227
7,337,217 B2 *  2/2008   Wang ................ 709/217
2001/0017857 A1*  8/2001   Matsukawa .......... 370/392
2001/0034759 A1*  10/2001   Chiles et al. ........ 709/203
2003/0177267 A1*  9/2003   Orava et al. ........ 709/245
2003/0212800 A1*  11/2003   Jones et al. ........ 709/228
2004/0006642 A1*  1/2004   Jang et al. ......... 709/245
2004/0014475 A1*  1/2004   Saito et al. ........ 455/445

FOREIGN PATENT DOCUMENTS

WO    WO 00/76174    12/2000
WO    WO 03/055180    7/2003

OTHER PUBLICATIONS

Newton, Harry, Newton's Telecom Dictionary, Feb. 2006, CMP Books, 22nd Edition, p. 564.*

* cited by examiner

Primary Examiner—Hassan Kizou
Assistant Examiner—Andrew Chriss
(74) Attorney, Agent, or Firm—Lee, Hong, Degerman, Kang & Waimey

(57) ABSTRACT

In the present invention, if it is determined that address assignment request messages are received from a plurality of devices, a home server on the network commands each of the plurality of devices to generate a temporary address. Receiving temporary addresses generated by the plurality of devices according to the address generation command, the home server assigns unique network addresses to the received temporary addresses and transmits the network addresses to the plurality of devices, thereby assigning a unique network address to each of the plurality of devices on the network.

22 Claims, 3 Drawing Sheets

US 7,564,804 B2

METHOD OF ASSIGNING ADDRESSES TO A PLURALITY OF DEVICES ON A NETWORK AND A NETWORK SYSTEM THEREFOR

CROSS-REFERENCE TO RELATED APPLICATIONS

Pursuant to 35 U.S.C. § 119(a), this application claims the benefit of earlier filing date and right of priority to Korean Application No. 0012577/2004, filed on Feb. 25, 2004, the contents of which are hereby incorporated by reference herein in their entirety.

BACKGROUND OF THE INVENTION

1. Field of the Invention

The present invention relates to a network system and a method of assigning network addresses to devices in the network system and, more particularly, but not by way of limitation, to a method of automatically assigning unique network addresses to a plurality of electronic appliances of the same kind when the plurality of electronic appliances are first connected to a home network and a home network system therefor.

2. Description of the Related Art

FIG. 1 illustrates an example of a home network system, which will be described below in detail.

The manager of the home network system can control a plurality of electronic appliances connected to a home network N in a centralized way by transmitting control commands to the plurality of electronic appliances and receiving information about the execution results of the control commands through a different appliance such as a PC or a TV.

Such a centralized control scheme requires a home server. The home server is commonly built into an electronic appliance and an electronic appliance with a built-in home server is called a home server appliance. A home server appliance processes control signals sent to and received from a plurality of electronic appliances connected to the home network N (e.g., refrigerators and air conditioners). In addition, the home server appliance assigns a unique network address to an electronic appliance when the appliance is connected to the network for the first time.

The electronic appliances, which are identified on the network by their respective network addresses assigned by the home server appliance, are called client appliances. A client appliance (e.g., C1~C4 shown in FIG. 1) has a microprocessor for executing a program for home networking and processes data exchanged through the home network N.

In the home network system shown in FIG. 1, the refrigerator acts as the home server and a washing machine C4, a microwave oven C3, etc are connected to the home network as client appliances.

To control a plurality of client appliances through the home network, the home server appliance assigns a unique network address to each of the client appliances when it is connected to the home network N for the first time so that the client appliances can be identified on the network. When receiving a control signal or a control result through the network, the home server appliance detects the source of the signal based on the network address assigned to each of the plurality of client appliances.

FIG. 2 is a flow chart illustrating how a network address is assigned to a client appliance on the home network shown in FIG. 1. When a client appliance hooks up to the home network N first, the client appliance transmits an address assignment request message to the home server appliance (S1). Receiving the address assignment request message, the home server appliance generates a unique network address (S2) and transmits the generated address to the client appliance (S3). Given the network address, the client appliance sets up its network address (S4) and transmits a confirmation message about the address setup to the home server appliance (S5), which completes the network address assignment process.

If a plurality of client appliances of the same kind are connected to the home network N at the same time, the plurality of client appliances transmit their respective address assignment request messages to the home server appliance almost simultaneously. For example, if the power to multiple air conditioners sharing power is turned on as they are physically connected to the home network N, the multiple air conditioners transmit address assignment request messages to the home server appliance almost simultaneously. The source address included in an address assignment request message comprises a product code indicating the product type and a logical address that is commonly set to 0 at factory. Because the air conditioners are of the same kind, they have the same product code and logical address, which means the source addresses included in the address assignment request messages are all identical. As a result, the home server appliance cannot identity the individual sources of the received address assignment request messages.

The home server appliance generates and assigns only one network address to the plurality of client appliances that are indistinguishable on the home network. Consequently, the plurality of client appliances are assigned the same network address and the home server appliance has no means of individually controlling the plurality of client appliances on the home network.

To avoid this problem, the user needs to connect client appliances to the home network one by one so that the home server appliance can generate and assign a unique network address to each of the client appliances. The idea of connecting client appliances individually, however, is a constraint on network management and is not feasible in some cases in which built-in electronic appliances sharing the same power input are used.

SUMMARY OF THE INVENTION

In view of the shortcomings of the prior art, it is an object of the present invention to provide a method of identifying a plurality of electronic appliances connected to a network for the first time and simultaneously and assigning a unique network address to each of the plurality of electronic appliances and a home network system for implementing the method.

In the method of assigning network addresses to a plurality of devices on a home network according to the present invention, if it is determined that address assignment request messages are received from a plurality of devices, a home server on the network commands the plurality of devices to generate a temporary address. Receiving temporary addresses generated by the plurality of devices, the home server assigns unique network addresses to the received temporary addresses and transmits the network addresses to the plurality of devices, thereby assigning a unique network address to each of the plurality of devices on the network.

In one embodiment of the invention, if a home server receives an address assignment request message, the home server waits from that point during a time interval that is longer than the period for the address assignment request message and shorter than double the period and determines that more than one device transmits address assignment request messages if two or more address assignment request messages having the same source address are received during the time interval.

In another embodiment, a network address comprises a product code and a logical address and the assignment of a unique network address is obtained by assigning a unique logical address.

In still another embodiment, the range of temporary addresses is specified when a command for generating a temporary address is given to a plurality of devices.

In yet another embodiment, if some of the temporary addresses generated according to a command for generating temporary addresses are identical, the command for generating temporary addresses are transmitted again to the devices that generated the identical address.

In a further embodiment, if the number of address setup confirmation messages received after unique network addresses are assigned to a plurality of temporary addresses using temporary addresses is not the same as the number of the assigned network addresses, the process of address assignment is executed again.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

In order that the invention may be fully understood, preferred embodiments thereof will now be described with reference to the accompanying drawings.

Figure 1:
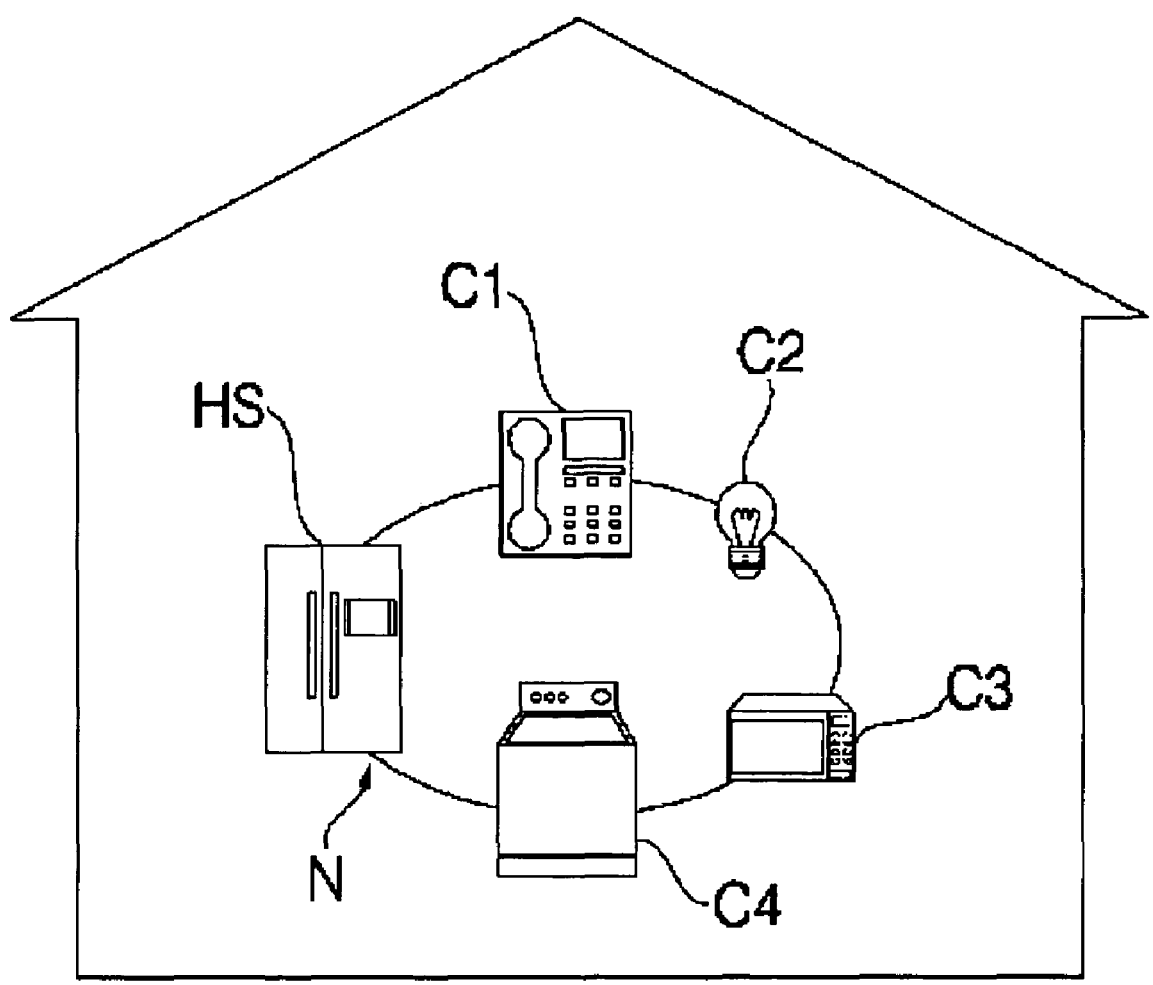
FIG. 1 illustrates a home network system established in a house.
Figure 2:
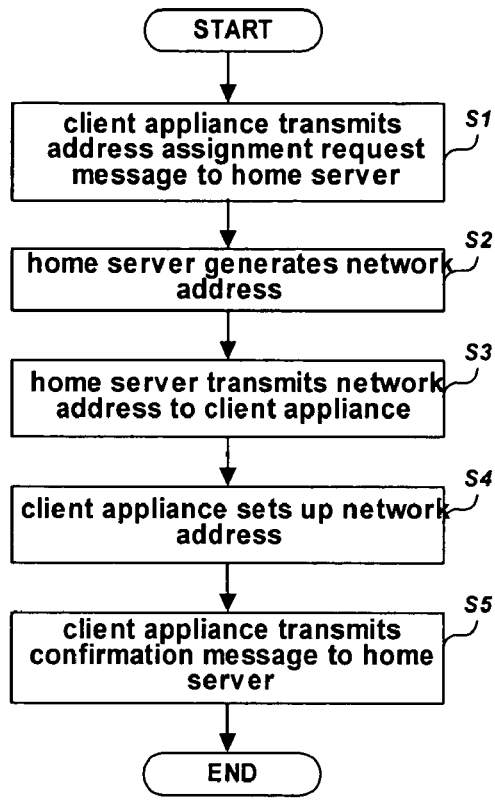
FIG. 2 illustrates a flow chart of a method of assigning a network address to a client appliance on the network shown in FIG. 1.
Figure 3:
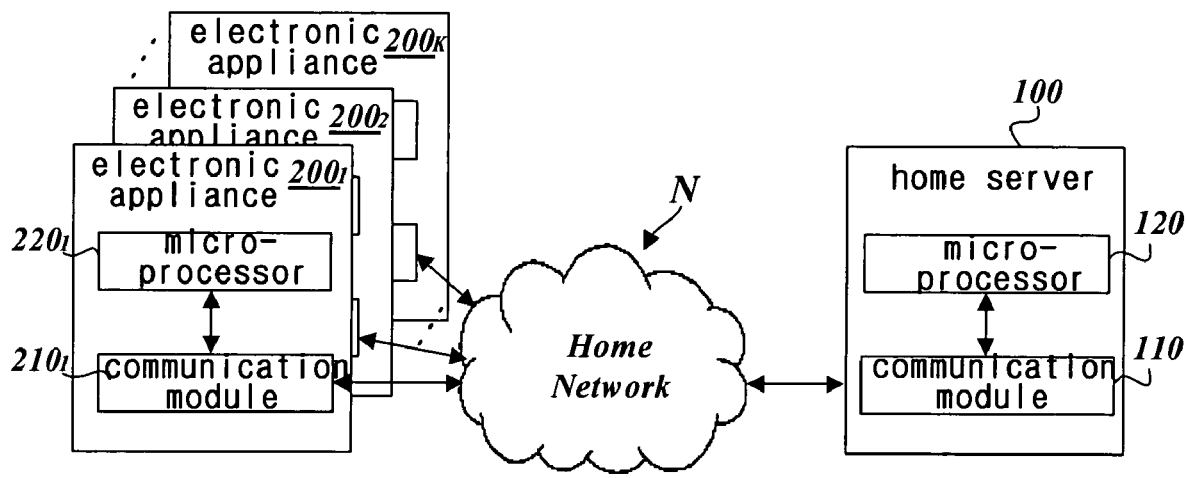
FIG. 3 illustrates a home network system embodying the present invention.

FIG. 3 shows a home network system wherein the present invention may be advantageously embodied, comprising a plurality of electronic appliances $200_1, 200_2, \ldots, 200_k$ connected to a home network N established in a house and a home server 100 that assigns network addresses to the electronic appliances. If two or more address assignment request messages having the same source address are received (from the same appliance) during a predefined time interval after an address assignment request message was first received, the home server 100 transmits an address generation command message for commanding the generation of a temporary address to the electronic appliance.

The home network N through which the plurality of electronic appliances $200_1, 200_2, \ldots, 200_k$ and the home server 100 are connected can be a LAN such as Ethernet, a wireless communication network (LAN) using 2.5 GHz frequency, or a power line communication network providing data communication over existing power transmission and distribution networks.

Each of the electronic appliances $200_k$ includes a communication module $210_K$ for sending/receiving messages to/from the home server 100 through the network N and a microprocessor $220_k$ for generating a temporary address and transmitting the generated address to the home server 100 when an address generation command message is received from the home server 100 through the communication module $210_k$. When the electronic appliance $200_k$ is connected to the network N for the first time, the microprocessor $220_K$ generates an address assignment request message and transmits the message to the home server 100 through the communication module $210_K$ for requesting a unique network address. The address assignment request message includes a 2-byte source address (device address) comprising a 1-byte product code and a 1-byte logical address commonly set to 0x00 at factory.

The home server 100 includes a communication module 110 for exchanging messages with each of the client appliances $200_K$ and a microprocessor 120, responsive to an address assignment request message or a temporary address received through the communication module 110, for generating and assigning a network address or a part thereof (e.g., logical address).

If an address assignment request message is received from the electronic appliance $200_K$, the home server 100 waits for additional address assignment request messages to be received during a predefined time interval after that point. If an electronic appliance is connected to the network for the first time, the electronic appliance transmits an address assignment request message periodically with fixed period Taddr_req. The predefined time interval is set to a value between 1.5~2 times greater than the period for the address assignment request message (Taddr_req). If only one electronic appliance is connected to the network N, the home server 100 receives only one additional address assignment request message during the predefined time interval. Therefore, if two or more additional address assignment request messages having the same source device address are received after the initial request message, the microprocessor 120 of the home server 100 concludes that two or more electronic appliances of the same kind are connected to the network N.

If it is determined that only one new device is connected to the network, the microprocessor 120 generates a logical address that is one greater than the last of the logical addresses that have been assigned to devices on the network so far and transmits the generated logical address to the device through the communication module 110. Receiving the logical address, the electronic appliance 200 sets up its network address by combining the received logical address with its own product code and transmits an address assignment completion message to the home server 100.

If two or more address assignment request messages having the same device address (e.g., 0x0A00) are received during the predefined time interval, the microprocessor 120 of the home server 100 generates an address generation command message destined for the device address (e.g., 0x0A00) when the predefined time interval expires in order to assign unique network addresses to the plurality of electronic appliances connected to the network N. The address generation command message includes the range of allowable addresses. The start address of the address range is set to the value one greater than the sum of the last of the logical addresses that have been assigned thus far (AdLast) and the number of devices that requested address assignment (Ld). The number of devices can be determined from the number of address assignment request messages received during the predefined time interval. The end address of the address range is set to the allowable maximum logical address. The logical addresses from AdLast+1 through AdLast+Nd will be assigned to the devices that requested the address assignment and therefore are not allowed as temporary addresses. For example, if the last assigned logical address is 0x10, the range of allowable addresses is from 0x10+Nd+1 through 0xNNmax.

For simplicity, suppose that each of two electronic appliances $200_1$ and $200_2$ transmitted an address assignment request message having 0x0A00 as the source address (product code 0x0A and factory-set logical address 0x00) and then received an address generation command message transmitted by the home server 100.

Each of the electronic appliances $200_1$ and $200_2$ selects one logical address at random within the allowable address range included in the address generation command message, determines its temporary network address by combining the selected logical address with its own product code, and transmits the determined temporary address to the home server 100. The home server 100 examines if the electronic appliances $200_1$ and $200_2$ transmitted the same temporary address. If so, the home server 100 retransmits an address generation command message to the received temporary address so that the electronic appliances $200_1$ and $200_2$ select their respective temporary addresses again. If the received temporary addresses are not identical, the home server 100 assigns sequential logical addresses starting from the next address of the last assigned logical address (e.g., 0x11) to the electronic appliances $200_1$ and $200_2$ and transmits the assigned logical addresses to the corresponding temporary addresses.

As a result, the electronic appliances $200_1$ and $200_2$ of the same kind receive 0x11 and 0x12 as their respective logical addresses and are assigned unique network addresses 0x0A11 and 0x0A12, respectively.

After setting their assigned network addresses, the electronic appliances $200_1$ and $200_2$ transmit address assignment completion messages to the home server 100. If the number of address assignment completion messages that the home server 100 receives is more than that of the logical addresses that the home server 100 assigned, it means that more than one device was assigned the same logical address. In this case, the home server 100 transmits the address generation command message again to the devices that transmitted the address assignment completion messages having the same network address so that the above procedure is repeated by the devices.

Figure 4:
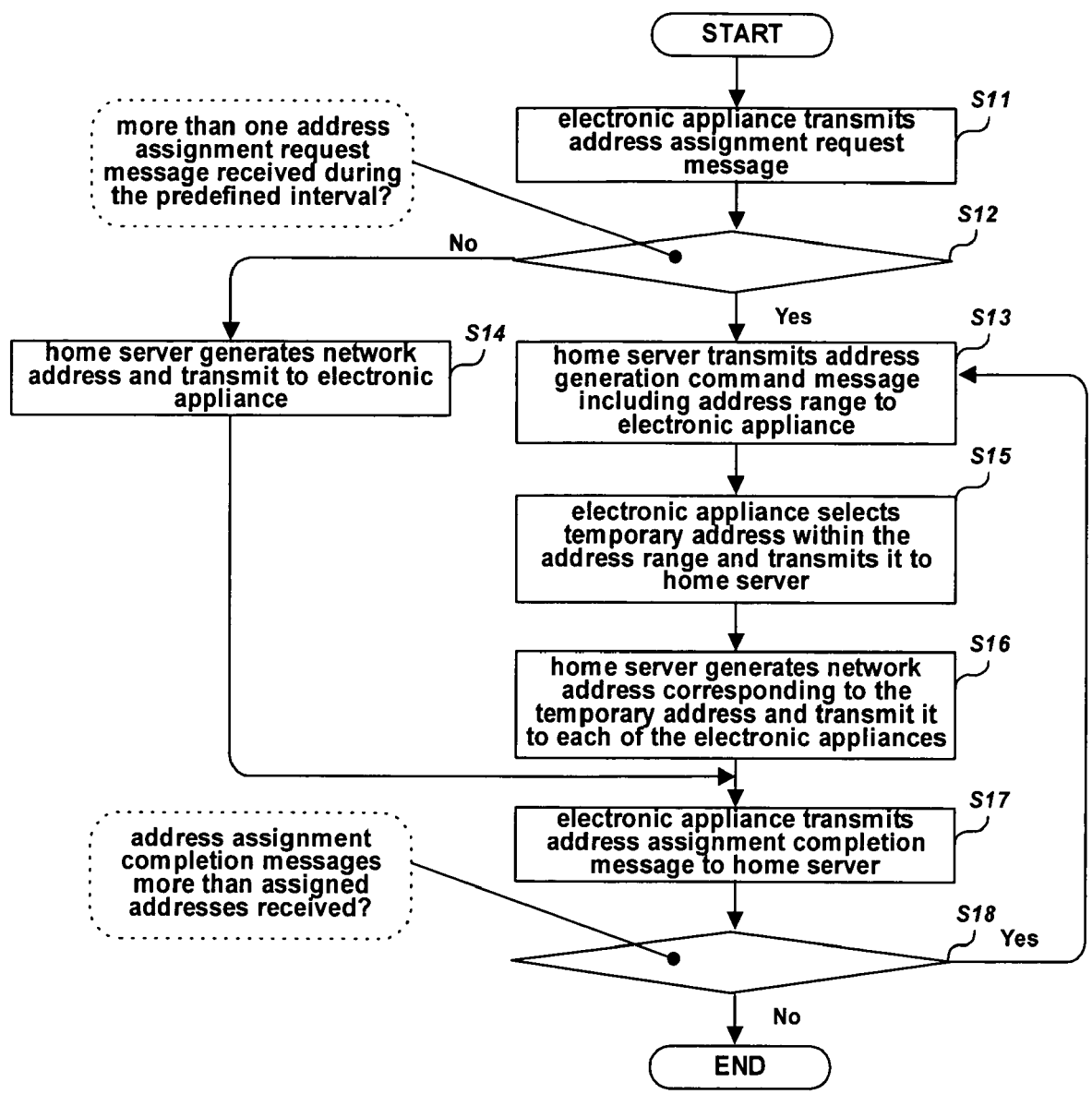
FIG. 4 illustrates a flow chart of the method of assigning a unique network address to each of a plurality of devices on the home network in accordance with the present invention.

FIG. 4 illustrates the flowchart of the method of assigning unique network addresses to a plurality of devices on a home network system according to the present invention.

An electronic appliance connected to a home network for the first time transmits an address assignment request message to a home server (S11).

If the home server receives more than one additional address assignment request message from electronic appliances having the same network address comprising the same product code and logical address during the predefined time interval after the reception of the first address assignment request message (S12), the home server transmits an address generation command message to the network address (S13). If only one additional address assignment request message is received during the predefined time interval (S12), the home server generates one logical address and transmits it to the corresponding electronic appliance (S14).

Each of a plurality of electronic appliances that receive the address generation command message from the home server generates a temporary address by selecting one address at random within the allowable address range specified by the address generation command message and transmits the temporary address to the home server (S15).

Receiving unique temporary addresses from the plurality of electronic appliances, the home server generates unique logical addresses corresponding to the received temporary addresses and transmits the logical addresses to the plurality of electronic appliances that transmitted the temporary addresses (S16).

After receiving the logical addresses from the home server, the plurality of electronic appliances set up their respective network addresses and transmit address assignment completion messages back to the home server (S17). If the number of address assignment completion messages received by the home server exceeds the number of assigned logical addresses, it means that one address has been assigned to more than one device and steps S13 through S17 are repeated to assign network addresses again.

The method of assigning network addresses to a plurality of devices on a home network according to the present invention can assign unique network addresses to electronic appliances sharing the same power automatically, which provides a more convenient network environment for users.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

What is claimed is:

1. A network system to which a plurality of devices are connected, comprising:
   a home server; and at least one device that transmits an address assignment request message to the home server when it is connected to the network, wherein if it is determined that the address assignment request message is transmitted by a plurality of devices of a same kind, the home server assigns unique network addresses to the plurality of devices by commanding the plurality of devices to generate temporary addresses, the temporary addresses being received by the home server, and assigning a unique network address to each of the plurality of devices using the temporary addresses generated by the plurality of devices.

2. The network system set forth in claim 1, wherein the at least one device transmits the address assignment request message periodically after it is connected to the network.

3. The network system set forth in claim 2, wherein if the home server receives an address assignment request message, the home server waits from that point during a time interval that is longer than the period for the address assignment request message and shorter than double the period and determines that more than one device transmits address assignment request messages if two or more address assignment request messages having the same source address are received during the time interval.

4. The network system set forth in claim 1, wherein the address assignment request message transmitted by the at least one device to the home server has a network address comprising a factory-set product code and a logical address as its source address.

5. The network system set forth in claim 4, wherein the home server assigns unique network addresses to the plurality of devices by assigning a unique logical address to the factory-set logical address of each of the plurality of devices.

6. The network system set forth in claim 1, wherein the home server specifies the range of allowable temporary addresses when the home server commands the plurality of devices to generate temporary addresses.

7. The network system set forth in claim 6, wherein addresses included in the specified range are greater than the sum of the last address among addresses that have been assigned thus far and the number of the plurality of devices.

8. The network system set forth in claim 7, wherein the number of the plurality of devices is determined based on the number of address assignment request messages received during a predefined time interval after the reception of the initial address assignment request message.

9. The network system set forth in claim 7, wherein the home server assigns sequential network addresses corresponding to the generated temporary addresses to the plurality of devices, the sequential network addresses starting from the address one greater than the last address.

10. The network system set forth in claim 1, wherein if some of the temporary addresses generated according to the command for generating temporary addresses are identical, the home server retransmits the command for generating temporary addresses to the identical temporary address.

11. The network system set forth in claim 1, wherein if the number of address setup confirmation messages received after the home sever transmits the network addresses corresponding to the temporary addresses to the plurality of devices is not the same as the number of the assigned network addresses, the home server retransmits the command for generating temporary addresses to a part or all of the plurality of devices.

12. A method of assigning network addresses to devices connected to a network established in a house, conducted by a home server, the method comprising: determining if received address assignment request messages are transmitted by a plurality of devices of a same kind; commanding the plurality of devices to generate temporary addresses and then receiving the generated temporary addresses, if it is determined that the address assignment request messages are transmitted by a plurality of devices of the same kind; and assigning unique network addresses using the received temporary addresses to the plurality of devices respectively.

13. The method set forth in claim 12, wherein the plurality of devices transmit the address assignment request messages periodically after the plurality of devices are connected to the network.

14. The method set forth in claim 13, wherein if an address assignment request message is received, determining if received address assignment request messages are transmitted by a plurality of indistinguishable devices comprises pausing from a point during a time interval that is longer than the period for the address assignment request message and shorter than double the period and determines that a plurality of devices transmit the address assignment request messages if two or more address assignment request messages having the same source address are received during the time interval.

15. The method set forth in claim 12, wherein each of the address assignment request messages transmitted by the plurality of devices to the home server has a network address comprising a factory-set product code and a logical address as its source address.

16. The method set forth in claim 15, wherein assigning unique network addresses to the plurality of devices comprises assigning unique network addresses to the plurality of devices by assigning a unique address to the factory-set logical address of each of the plurality of devices.

17. The method set forth in claim 12, wherein commanding the plurality of devices to generate temporary addresses comprises specifying the range of allowable temporary addresses when commanding the plurality of devices to generate temporary addresses.

18. The method set forth in claim 17, wherein addresses included in the specified range are greater than the sum of the last address among addresses that have been assigned thus far and the number of the plurality of devices.

19. The method set forth in claim 18, wherein the number of the plurality of devices is determined based on the number of address assignment request messages received during a predefined time interval after the reception of the initial address assignment request message.

20. The method set forth in claim 18, wherein assigning unique network addresses to the plurality of devices comprises assigning sequential network addresses corresponding to the received temporary addresses to the plurality of devices, the network addresses starting from the address one greater than the last address.

21. The method set forth in claim 12, wherein if some of the received temporary addresses are identical, assigning unique network addresses to the plurality of devices comprises does not assigning addresses and retransmitting the command for generating temporary addresses to the identical temporary address.

22. The method set forth in claim 12, further comprising:
retransmitting the command for generating temporary addresses to a part or all of the plurality of devices if the number of address setup confirmation messages received after the step of assigning unique network addresses to the plurality of devices is not the same as the number of the assigned network addresses.

* * * * *